United States Patent [19]

Sievers

[11] 4,386,310

[45] May 31, 1983

[54] CONSTANT FREQUENCY AUTOMOTIVE ALTERNATOR BATTERY CHARGING SYSTEM

[75] Inventor: Kirk A. Sievers, Roselle, Ill.

[73] Assignee: Motorola Inc., Schaumburg, Ill.

[21] Appl. No.: 137,334

[22] Filed: Apr. 4, 1980

[51] Int. Cl.³ .............................................. H02J 7/14
[52] U.S. Cl. ...................................... 322/28; 322/73; 320/64
[58] Field of Search ............... 322/28, 72, 73; 320/64, 320/68, 21

[56] References Cited

U.S. PATENT DOCUMENTS

| | | | |
|---|---|---|---|
| 3,273,049 | 9/1966 | Shano | 322/28 |
| 3,293,536 | 12/1966 | Byles | 322/28 |
| 3,617,857 | 11/1971 | Gunderson | 322/28 |
| 3,629,689 | 12/1971 | Riff | 322/28 |
| 3,670,243 | 6/1972 | Joyce . | |
| 3,820,009 | 6/1974 | Itoh et al. | 322/28 |
| 3,855,520 | 12/1974 | Stich | 323/19 |
| 3,942,097 | 3/1976 | Itoh et al. | 322/28 |
| 3,984,755 | 10/1976 | Lehnhoff et al. | 322/28 |
| 4,030,015 | 6/1977 | Herco et al. | 323/DIG. 1 X |
| 4,035,710 | 7/1977 | Joyce | 363/37 |
| 4,044,296 | 8/1977 | Dhyanchand et al. | 322/25 |
| 4,095,165 | 6/1978 | Boros | 323/17 |
| 4,275,344 | 1/1981 | Mori et al. | 322/28 |

FOREIGN PATENT DOCUMENTS 1392096  4/1975  United Kingdom ............ 320/64 X

Primary Examiner—R. J. Hickey
Attorney, Agent, or Firm—Phillip H. Melamed; James S. Pristelski; James W. Gillman

[57] ABSTRACT

A regulated automotive alternator battery charging system is disclosed. The system comprises an engine-powered alternator which provides a rectified alternator output signal for charging an automobile battery in accordance with an alternator field coil excitation signal provided by a voltage regulator which senses the battery voltage and alters the field coil excitation in response thereto to maintain the battery in a charged condition. The voltage regulator comprises an oscillator for developing a constant frequency signal which is independent of engine speed and battery load. The regulator includes circuitry for varying the duty cycle of this constant frequency signal in accordance with the sensed magnitude of battery voltage, and the constant frequency but variable duty cycle signal is utilized to provide field coil excitation for the alternator wherein the system maintains the battery voltage at a substantially constant magnitude.

6 Claims, 3 Drawing Figures

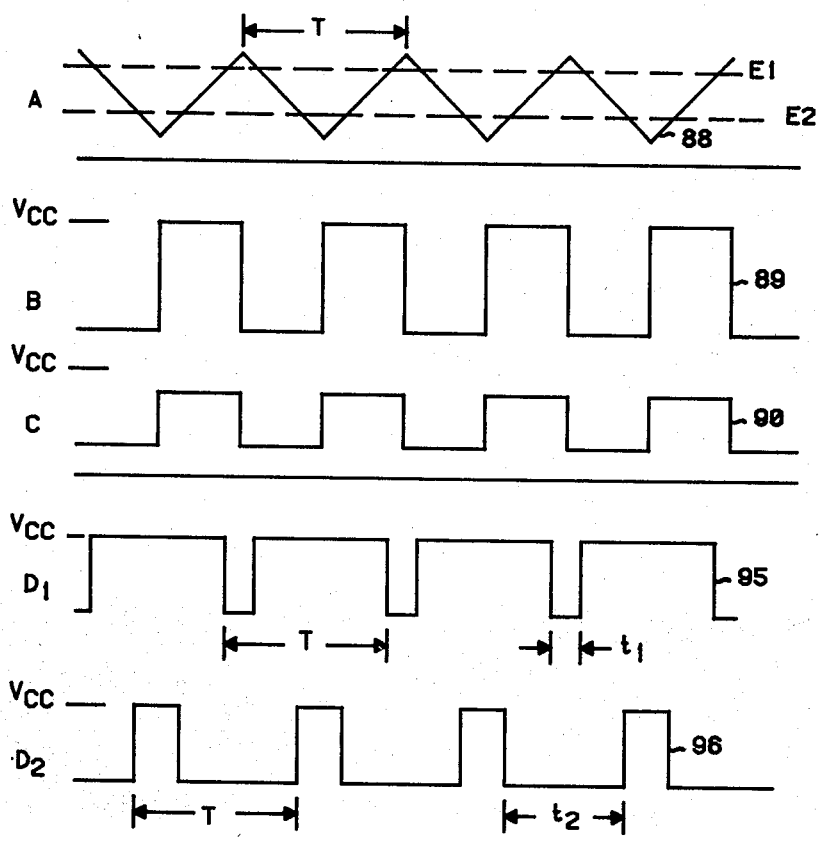

CONSTANT FREQUENCY AUTOMOTIVE ALTERNATOR BATTERY CHARGING SYSTEM

BACKGROUND OF THE INVENTION

The present invention relates generally to the field of regulated automotive vehicle alternator battery charging systems in which an alternator supplies a rectified charging signal to maintain the battery in a charged condition by sensing the battery voltage and utilizing a voltage regulator in a closed feedback system to control the alternator field coil excitation current to control the charging output of the alternator. Typically, transistorized alternator voltage regulators are utilized to control the alternator field coil excitation in response to the sensed battery voltage. These systems act to maintain the battery voltage substantially constant, generally between high and low voltage limits, and thereby maintain the battery in a charged condition.

Some prior charging systems provide a continuous proportional DC field coil excitation current in response to the sensed battery voltage, but these systems suffer from excessive power dissipation in the transistor control device that provides the continuous field coil excitation. More typically, present day transistor voltage regulators are operative in an on/off mode wherein a transistor device is utilized to alternately stepwise excite the alternator field coil between full and zero excitation, wherein both the rate of this alternate stepwise excitation and the duration of the periods of excitation and de-energization of the field coil vary in accordance with engine speed and the resistive load placed upon the battery. An example of such a battery charging system using an on/off regulator in U.S. Pat. No. 3,273,049 assigned to the same assignee as the present invention. This type of battery charging system has the advantage of minimizing the power dissipation requirements required for the transistor control device that controls the field coil excitation. However, these types of charging systems are subject to creating low frequency ripple voltages across the battery due to the low frequency, intermittent battery charging operation of the alternator. This results in having automotive accessories which are run off of the battery, such as the automobile headlights and instrument indicator lights, suffer from low frequency battery voltage variations which in the case of headlights will cause an annoying flickering of the headlights. This phenomena becomes extremely pronounced at low engine speeds since under those conditions it may take a significant amount of time for the alternator to charge up the battery once the battery voltage has fallen below a minimum threshold. In addition, battery charging systems of the above type also suffer from overshoot problems wherein in order to provide the desired switching action of the alternator field current, maximum and minimum switching levels have to be built into the voltage regulator sensing circuit. Thus when a low battery voltage is sensed, the alternator must charge the battery to a value above its actual desired charge value and substantially above the sensed minimum battery voltage threshold level in order to terminate the field coil excitation. If the on/off field excitation levels are too close, then power dissipation for the control device becomes a problem, and if they are too widely spaced then at low engine speeds the headlights will flicker.

SUMMARY OF THE PRESENT INVENTION

An object of the present invention is to provide an improved vehicle alternator battery charging system operative in an on/off field coil excitation mode which overcomes the disadvantages of such charging systems discussed above.

A more specific object of the present invention is to provide an improved battery charging system in which the effective rate of field coil excitation is independent of engine speed and battery load.

In one embodiment of the present invention a regulated automotive alternator battery charging system is provided, comprising: a battery; an alternator means coupled to said battery and driven by a vehicle engine for providing a rectified alternator output charging signal for charging said battery in accordance with an excitation signal received by an alternator field coil; and voltage regulator means coupled to said alternator means for providing said excitation signal in response to a sensed signal magnitude related to battery voltage, said battery, alternator means and regulator means forming a closed loop feedback system for maintaining the charge on said battery, said voltage regulator means including means for developing a substantially constant frequency signal, means for varying the duty cycle of this constant frequency signal in accordance with the sensed signal magnitude and means for utilizing the variable duty cycle, constant frequency signal to control the effective field coil excitation of said alternator to provide for effective field coil excitation at an engine speed independent constant frequency, whereby battery voltage overshoot is minimized and effective slow switching of the excitation of said alternator field coil, at rates below said constant frequency, is prevented.

Basically, the present invention utilizes a constant frequency triangle wave generator to supply one input to a voltage comparator which receives another input related to battery voltage. The output of the comparator is constant frequency signal which has a duty cycle that is variable in accordance with the sensed battery voltage. The comparator output is utilized to control the effective alternator field coil excitation current which results in alternator output windings providing a rectified battery charging voltage for charging the battery so as to maintain the battery voltage at a predetermined value. Essentially, the regulator of the present invention implements a pulsewidth modulation of the field coil excitation signal in accordance with the sensed battery voltage in a closed loop battery charging control system, and this results in having the alternator charging signal occur at a constant frequency so as to prevent any low frequency ripple in the battery voltage. The present system also prevents any substantial battery overshoot voltage from occurring since the system is more directly responsive to the sensed battery voltage and does not require minimum and maximum thresholds of battery voltage for implementing and terminating field coil excitation, respectively, since the duty cycle of the field coil excitation can vary continuously as a function of sensed battery voltage.

BRIEF DESCRIPTION OF THE DRAWINGS

For a more complete understanding of the present invention reference should be made to the drawings, in which.

FIG. 3 comprises a series of graphs A-$D_2$ illustrating signal waveforms produced by the circuits illustrated in FIGS. 1 and 2.

DESCRIPTION OF THE PREFERRED EMBODIMENT

Figure 1:
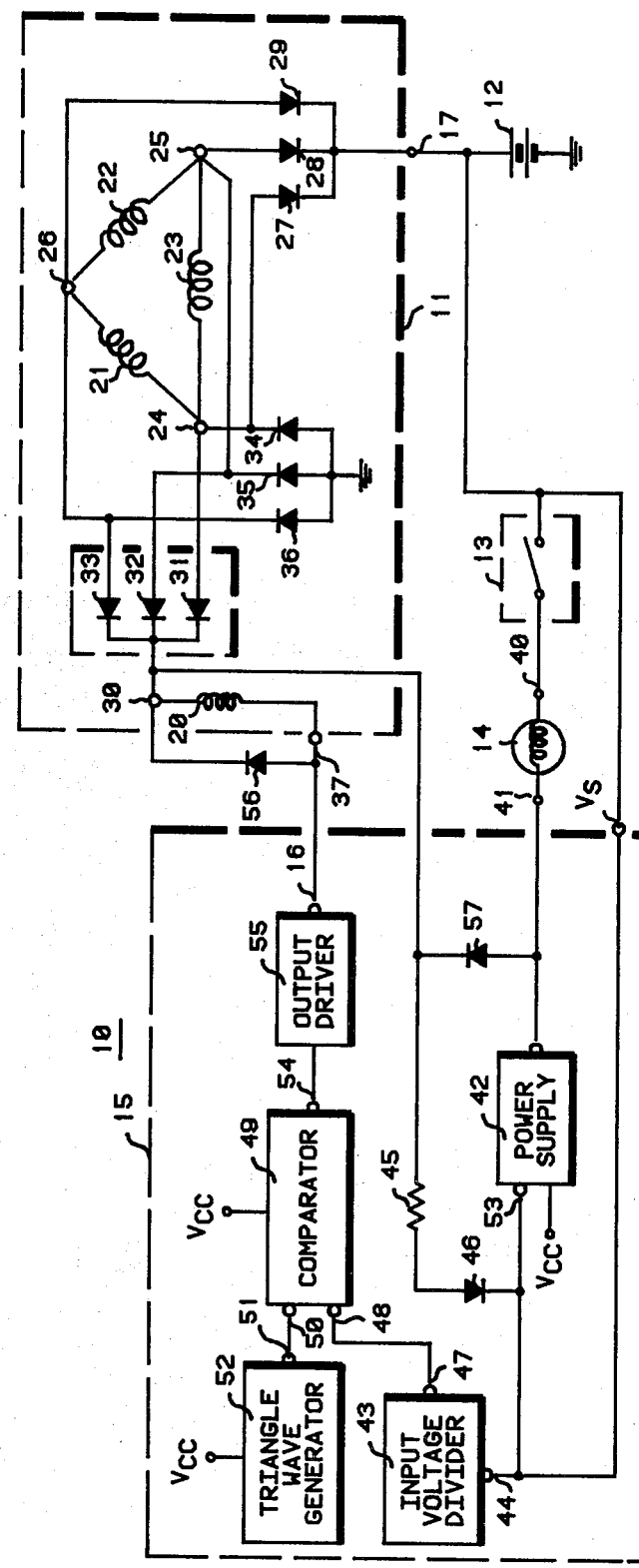
FIG. 1 is a combination block and schematic diagram of an automotive alternator battery charging system.

Referring to FIG. 1, a constant frequency automotive alternator battery charging system 10 is illustrated. The battery charging system essentially comprises an alternator 11 (shown dashed), a battery 12, an ignition switch 13, a charge indicating lamp 14 and a voltage regulator 15 (shown dashed). Essentially a voltage sensing terminal $V_S$ of the voltage regulator is coupled to the positive terminal of the battery 12 and provides a sensed signal magnitude related to battery voltage. The voltage regulator 15, in response to the sensed battery voltage, provides an alternator field coil excitation signal at an output terminal 16 which results in the alternator 11 providing a rectified alternator output charging signal between an output terminal 17 and ground wherein terminal 17 is directly connected to the positive terminal of the battery 12 and the negative terminal of the battery 12 is coupled to ground. In this manner the battery charging system 10 forms a closed loop feedback system wherein the alternator maintains the voltage across the battery 12 at a preset magnitude and thereby maintains the battery in a charged condition.

The alternator 11 comprises a rotatable field coil winding 20 which is contemplated as being rotated in synchronization with the crankshaft of an automobile engine. The alternator 11 also comprises three stationary alternator output windings 21-23 which are connected in a delta configuration between three node terminals 24-26. Each of the terminals 24-26 is coupled through a respective positive rectifying diode 27-29 to the positive rectified output terminal 17 wherein the cathodes of the diodes 27-29 are directly connected to terminal 17. Each of the terminals 24-26 is also connected to an auxiliary positive rectified output terminal 30 through respective diodes 31-33 with the cathodes of these diodes each being coupled to terminal 30. Each of the terminals 24-26 is also coupled to ground through respective negative rectifying diodes 34-36 with the anodes of each of these diodes being directly connected to ground. One end of the alternator field coil 20 is directly connected to the rectified auxiliary output terminal 30 and the other end of the coil 20 is connected to an alternator field coil excitation terminal 37.

All of the components 20-37 are contemplated as being part of the alternator and residing either within or on the alternator housing. The alternator 11 essentially receives field coil excitation control signals at the terminal 37 which determine the amount of field coil excitation while a source of voltage is provided at terminal 30. In response to field coil excitation when the field coil is rotated, the alternator windings 21-23 in conjunction with the diodes 27-29 and 34-36 provide a rectified battery charging output signal between the positive output terminal 17 and ground, and this output signal is utilized for charging up the battery 12 to maintain this battery at a predetermined charge level corresponding to a preset battery voltage magnitude. It should be noted that the auxiliary output terminal 30 will be maintained at essentially the same potential as the terminal 17 (which corresponds to the battery voltage) when the alternator is operative, wherein the voltage at the terminal 30 is isolated from the battery voltage and voltage at the terminal 17 by the rectifying diodes. The structure and operation of the alternator 11 is well known to those of average skill in the art and therefore will not be discussed further.

The ignition switch 13 is serially connected between a first terminal 40 of the charge indicating lamp 14 and the positive terminal of the battery 12. A second terminal 41 of the lamp 14 is coupled as an input to the regulator 15. Essentially, the ignition switch 13 controls the supplying of field current excitation through the lamp 14 and also provides a switching voltage at the terminal 41 which turns on a power supply circuit 42 within the regulator 15. Essentially the ignition switch 13 corresponds to the automobile ignition switch for the automobile engine that powers the alternator 11 and supplies power to the automobile ignition system. The function and operation of the switch 13 and lamp 14 are well known to those of average skill in the art and therefoe will not be discussed further.

The voltage regulator 15, besides comprising the power supply circuit 42 which receives an input through a direct coupling to the terminal 41, also comprises an input voltage divider circuit 43 which has an input terminal 44 directly connected to the voltage sensing terminal $V_S$ and connected to the rectified auxiliary positive output alternator terminal 30 through the series connection of a resistor 45 and a diode 46 with the cathode of the diode 46 directly connected to the terminal 44. The input voltage divider 43 essentially monitors the voltage at its input terminal 44 and provides a control voltage at an output terminal 47 in response thereto wherein the output terminal 47 is directly coupled to a first input terminal 48 of a comparator circuit 49. A second input terminal 50 of the comparator 49 receives its input signal by virtue of a direct coupling to an output terminal 51 of a triangle wave generator 52. Both the comparator 49 and the triangle wave generator 52 receive operative power by virtue of their connection to a stable regulated voltage terminal $V_{CC}$, and the power supply circuit 42 provides the stable voltage at the terminal $V_{CC}$ in response to the control signal received from its coupling to the terminal 41 and by virtue of the fact that it receives unregulated power from the connection of a power supply input terminal 53 to the terminal 44.

The comparator 49 essentially compares a constant frequency triangle wave signal produced by the generator 52 at the terminal 50 with a DC signal provided at the terminal 48 that is related to the sensed battery voltage. The comparator 48 provides an output in response to this comparison at an output terminal 54 which is coupled directly as an input to an output driver stage 55 that provides an output at the voltage regulator output terminal 16 which is directly coupled to the alternator field coil excitation terminal 37. A field coil flyback diode 56 is coupled in parallel with the field coil 20 between the terminals 30 and 37 and has its anode directly connected to the terminal 37. This diode insures that excessive reverse voltage spikes will not be produced in response to the termination of field coil excitation wherein these spikes could damage the output driver stage 55. In addition, a diode 57 is provided between the terminal 41 and the terminal 30 wherein this diode provides a path for the initial field coil excitation which is to be provided through the lamp 14 in a manner to be subsequently described.

The operation of the voltage regulator 15 will now be discussed with respect to FIG. 2 which illustrates typical embodiments for the power supply 42, the input voltage divider 43, the comparator 49, the triangle wave generator 52 and the output driver 55 of the voltage regulator 15. Identical reference numbers have been utilized in FIG. 2 to identify elements directly corresponding to elements in FIG. 1.

The power supply circuit 42 basically comprises an NPN transistor 60 having its base coupled through a resistor 61 to the terminal 41, its emitter directly connected to ground and its collector coupled through a resistor 62 to the base of a PNP transistor 63. The transistor 63 has its emitter directly connected to the terminal 53, its base connected through a resistor 64 to the terminal 53 and its collector coupled through a resistor 65 to the terminal $V_{CC}$ which is coupled to ground through a capacitor 66 in parallel with a Zener diode 67 having its anode connected to ground. Essentially, when the ignition switch 13 is closed a positive voltage is applied through the lamp 14 to the terminal 41. This voltage turns on the transistor 60 which in turn turns on the transistor 63 and provides a stable regulated voltage at the terminal $V_{CC}$ due to the voltage regulating action provided by the components 65–67 which regulate the coarsely regulated battery voltage provided at terminal 53. Typically the positive battery voltage terminal will be at more than ten volts and it is contemplated that the reverse breakdown voltage of the diode 67 will be such that approximately a six volt voltage will be produced at the terminal $V_{CC}$. This stable voltage at the terminal $V_{CC}$ is used to supply operative power to both the triangle wave generator 52 and the comparator circuit 49. It should be noted that the source of positive potential for creating the voltage at the terminal $V_{CC}$ comes from the unregulated voltage provided at the terminal 53 either by the direct connection of this terminal to the terminal $V_S$, or through the diode 46 and the series resistor 45.

During normal operation of the alternator battery charging system, the voltage at the terminal $V_S$ will be identical to the positive battery terminal voltage and this will be equal to the rectified alternator positive output voltage provided at the terminal 30. This will result in preventing the diode 46 from passing positive voltage from the terminal 30 to the terminal 53 under normal operative conditions. However, if for some reason the connection of the terminal $V_S$ to the positive battery terminal is broken, then the power supply 42 will still receive operative unregulated power by virtue of the components 45 and 46.

It should be noted that before the automobile engine commences rotation of the alternator field with respect to the stationary alternator windings 21–23, field excitation for the field coil 20 is supplied through the lamp 14 and diode 57. This results in lighting the lamp 14 and indicating that the alternator is not producing a substantial output. Once the field coil winding has commenced rotation, then a positive output voltage is provided at the auxiliary output terminal 30 and this terminal now supplies the source power for the field coil 20 and also results in preventing current flow through the diode 57. This results in extinguishing the lamp 14 since now there will be no low resistance path to ground provided for the terminal 41 since the input impedance of the transistor 60 will be high enough to prevent any substantial current flow from occurring through the lamp 14.

The input voltage divider circuit 43 essentially comprises two diodes connected in series between the terminal 44 and an internal terminal 70 which is connected to ground through a resistor 71 connected in series with the parallel combination of a capacitor 72 and the resistive element of a potentiometer 73. The potentiometer 73 has an adjustable center tap which is coupled through a resistor 74 to the terminal 47. Essentially, the divider circuit 43 receives a sensed voltage at the terminal 44 related to the battery voltage, divides this voltage down to a predetermined level determined by the setting of the potentiometer 73 while also filtering out excessive ripple due to the interaction of the components 71–73, and provides this divided down battery related voltage signal at the terminal 47.

During normal operative conditions, the signal at the terminal 44 is identical to the positive battery voltage and is identical to the voltage at the terminal $V_S$. However, if for some reason the connection between the terminal $V_S$ and the positive battery terminal is broken during operation of the alternator, then the terminal 44 will receive a positive input by virtue of the components 45 and 46 coupling the alternator output voltage produced at the terminal 30. In either event, the voltage regulator circuit 15, since it is part of a closed loop feedback system, will operate to maintain the magnitude of the voltage at the terminal 44 constant at a predetermined level determined by the setting of the potentiometer 73. With the terminal $V_S$ connected to the positive battery terminal this will ensure maintaining the positive battery terminal voltage at the magnitude of the voltage being maintained at the terminal 44. If the terminal $V_S$ is disconnected from the positive battery terminal, then instead of the input voltage divider erroneously sensing an extremely low battery voltage, the alternator auxiliary output terminal 30 will still provide excitation to the terminal 44 and the end result will be that the terminal 30 will be maintained at a constant potential which is slightly above the constant potential being maintained at the terminal 44 wherein this slightly higher potential is determined by the voltage drop of the diode 46 and the voltage drop across the resistor 45. This results in maintaining the battery at a slightly higher voltage than would be the case if the terminal $V_S$ had been directly connected to the positive battery terminal. The significance of this is that if the path provided by the components 45 and 46 were not present, then the battery charging system would generate an extremely large charging voltage in the event of the disconnection of the terminal $V_S$ from the positive battery terminal, and this would result in overcharging the battery and causing permanent damage to the battery and also possibly causing damage to the alternator. The present charging system avoids this occurrence through the use of the components 45 and 46.

The essence of the present invention involves the production of a constant frequency but variable duty cycle alternator field excitation signal. This is provided through the interaction of the triangle wave generator 52, the voltage divider 43 and the comparator 49. The operation of these circuits will now be described in detail with reference to the specific embodiments shown in FIG. 2 and with reference to the graphs of signal waveforms shown in FIGS. 3A–3D$_2$ wherein the graphs in FIG. 3 have a vertical axis representative of magnitude and all of the graphs have an equally scaled horizontal axis representative of time.

The triangle wave generator 52 comprises a voltage comparator 80 which provides an output signal at a terminal B by comparing signal waveforms received at a negative input terminal A, corresponding to the terminal 51, and a positive input terminal C. The terminal A is directly connected to ground through a capacitor 81 and connected to the terminal B through a resistor 82. The terminal C is connected to ground through the parallel combination of a capacitor 83 and a resistor 84, and is connected to the terminal B through a resistor 85 and connected to the terminal $V_{CC}$ through a resistor 86. The terminal B is also connected to the terminal $V_{CC}$ through a resistor 87.

Essentially the components 80–87 in the triangle wave generator 52 form an oscillator which produces a triangle waveform signal 88 shown in FIG. 3A at the terminal A. In order to generate the waveform 88, the generator 52 also produces the signal waveforms 89 and 90 which are illustrated in FIGS. 3B and 3C, respectively, and represent the signals at the terminals B and C. Basically, the triangle wave generator 52 is an oscillator wherein the creation of a positive output at the terminal B results in raising the voltage at the terminal C and causing the charging of the capacitor 81. When the capacitor 81 has been charged to a sufficiently high level as compared to the voltage at the terminal C, the comparator 80 will short the terminal B to ground thereby lowering the voltage at the terminal C and providing a discharge path for the voltage on the capacitor 81 through the resistor 82. The discharging of the capacitor 81 will continue until the voltage at the terminal A falls below the voltage at the terminal C in which case the entire process will be recommenced since this will result in the comparator 80 providing a voltage to the terminal B equal to the voltage $V_{CC}$. This operation is illustrated by the waveforms 88–90 in FIGS. 3A–3C and merely represents one technique of providing the constant frequency triangle waveform 88 at the terminal A.

The frequency of the waveform 88 is constant and is inversely related to its period T which is determined by the charging constant set up by the components 81 and 82. Preferably the frequency of the waveform 88 is about 50 Hz. The other components in the generator 52 have some effect on the period T and also determine the magnitude of the waveform 88. It should be noted that the frequency of the waveform 88, and therefore also its period, is totally unrelated to the speed of the engine which is rotating the alternator field coil 20 and is also unrelated to the resistive load being applied across the battery 12.

The triangle wave signal 88 is directly coupled to the input terminal 50 of the comparator 49 and the comparator compares this signal with DC reference levels provided at the terminal 48 which has also been termed terminal E. FIG. 3A illustrates two such DC levels $E_1$ and $E_2$ representing, respectively, conditions of relatively high and low battery voltage as sensed through the connection of the terminal $V_S$ to the positive battery terminal.

The comparator 49 essentially comprises a voltage comparator 91 having a negative input terminal coupled through a resistor 92 to the terminal 50 and a positive input terminal directly connected to the terminal E (48). The output of the comparator 91 is directly connected to a terminal D which corresponds to the output terminal 54 of the comparator 49, and this terminal is connected to the terminal $V_{CC}$ through a resistor 93 and is coupled to the terminal E through a resistor 94. Essentially, the comparator 49 provides a positive output at the terminal D in response to the voltage at the terminal 50, comprising the signal waveform 88, exceeding the voltage at the terminal E, and ground potential is provided at the terminal D in response to the reverse condition.

In response to the relatively high battery voltage signal $E_1$ being present at the terminal E, the comparator 91 produces the waveform 55 shown in FIG. $3D_1$ wherein it should be noted that the period of this waveform is identical to the period T of the waveform 88. The duration of time that the waveform 95 is at ground potential is designated as $t_1$. The signal 95 is a constant frequency signal having a period T wherein the duty cycle of this signal, as indicated by the duration of the times $t_1$, measured as a percentage of the period T, is directly related to the sensed battery voltage. This can be shown by analyzing the output of the comparator 91 at the terminal D in response to the low voltage level $E_2$ representative of a low battery voltage condition. In response to the low level $E_2$ at the terminal E, the comparator 91 will produce a waveform corresponding to the waveform 96 shown in FIG. $D_2$ wherein this waveform also has a constant period T but has a duty cycle related to the longer time duration $t_2$.

Essentially the comparator 91 creates the output signals 95 and 96 at the terminal D which represent constant frequency pulse width modulated output signals wherein the duty cycle of the signal at the terminal D is directly related to the sensed battery voltage, or in the case of the disconnection of the terminal $V_S$ from the positive battery terminal, the duty cycle of these waveforms is directly related to the auxiliary positive rectified output at the terminal 30 which is equivalent to the voltage at the positive battery terminal. In essence, the present invention through the use of the triangle wave generator 52, the comparator 49 and the input voltage divider 43 has developed a constant frequency excitation signal at the terminal D in which the duty cycle of this signal is variable in response to battery voltage but the frequency of this signal is independent of the battery voltage, engine speed and battery load. The present invention then utilizes the signal at the terminal D to provide the effective field coil excitation current for the field coil 20 so that the alternator output battery charging voltage at terminal 17 is also made substantially independent of engine speed and battery load since the duty cycle of the waveform at the terminal D will vary directly as a function of these charging system variables and since the rate of supplying field coil current excitation remains constant through the use of the constant frequency signal provided at the terminal D. Thus the battery voltage will remain at a regulated preset level while the charging system will compensate for any slight temporary changes in battery voltage, and this is accomplished by on/off switching of the field current as will subsequently be explained.

The function of the output driver stage 55 is merely to utilize the constant frequency but variable duty cycle signal provided at the terminal D to provide effective field coil excitation current in response to this signal. FIG. 2 illustrates a preferred embodiment for the output driver 55 wherein the driver 55 includes an NPN transistor 100 having its emitter directly connected to ground, its base connected to the terminal D through a diode 101 having its anode directly connected to terminal D and its collector to the effective input base terminal of a pair of Darlington connected NPN transistors 102. The effective emitter of the Darlington pair 102 is connected to ground, the effective base is connected through a resistor 103 to the terminal 30, and the effective collector is connected to the output terminal 16 of the output driver 55.

Figure 2:
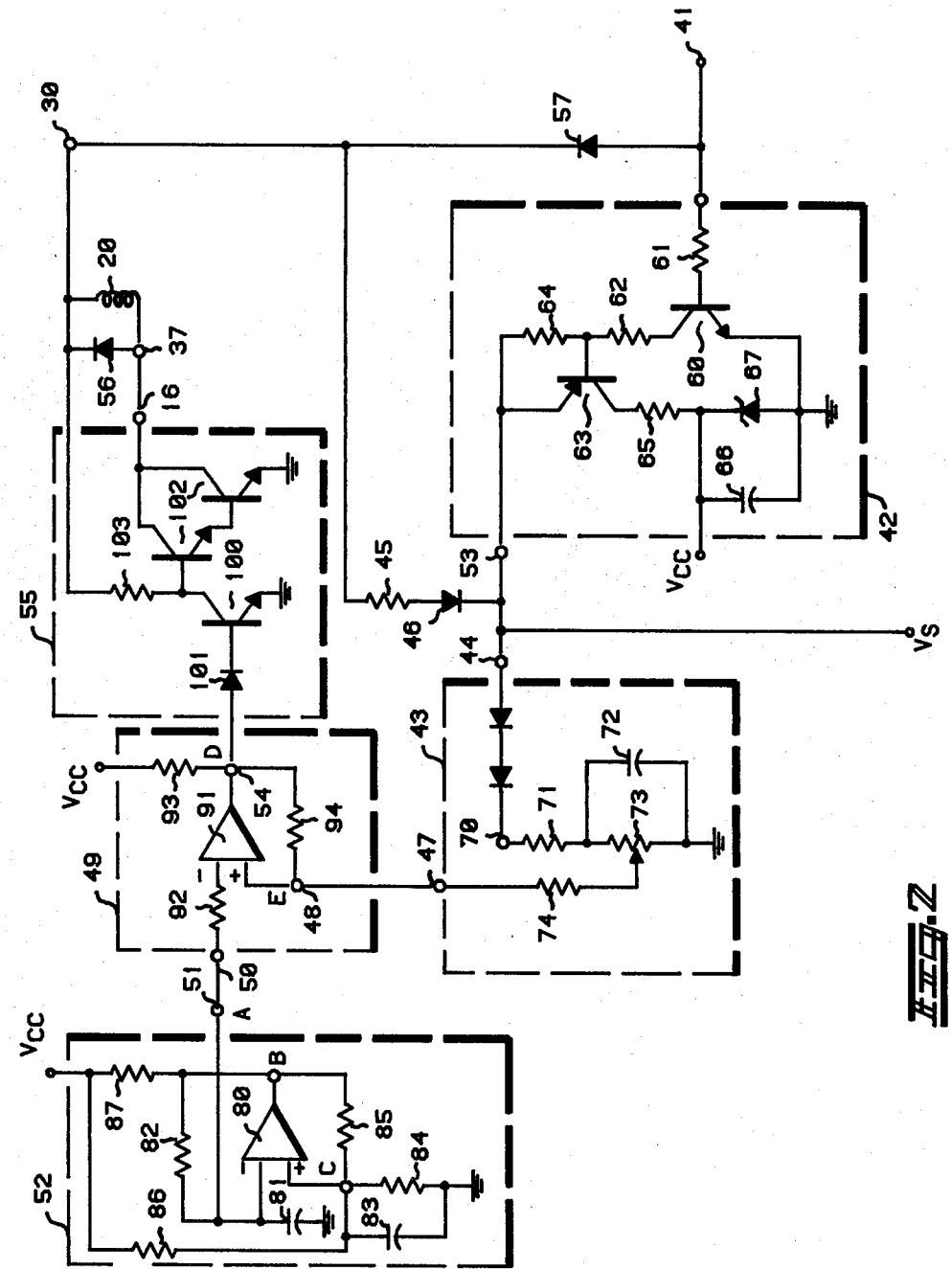
FIG. 2 is a detailed schematic diagram illustrating typical embodiments for several of the components shown in block form in FIG. 1.

The output driver 55 shown in FIG. 2 provides pulsating DC excitation current for the field coil 20 wherein this field coil excitation directly corresponds to the inverse of the waveforms 95 and 96 shown in FIGS. $3D_1$ and $3D_2$. This pulsating DC field coil excitation causes on/off switching of the alternator wherein the effective on times of the alternator correspond to the times $t_1$ and $t_2$ and maintain the battery at a constant voltage and charge level.

It should be noted that in other types of output drivers the constant frequency but variable duty cycle signal provided at the terminal D could also be used to gate an AC excitation signal, instead of DC, to the field coil 20 wherein the signal envelope of this AC signal would correspond to the signals at the terminal D. Types of output driver circuits which utilize this type of structure are illustrated in U.S. Pat. Nos. 3,617,857 and 3,629,689 which are utilized in conjunction with a brushless alternator, whereas the preferred embodiment of the present invention described herein is described in conjunction with a conventional brush-type alternator having DC field excitation supplied to the rotating field coil through commutating brushes.

By utilizing the constant freqency but variable duty cycle signal 95, 96 provided at the terminal D, the present invention has substantially prevented the occurrence of low frequency alternator output ripple due to the low frequency intermittent application of field coil excitation. Also the use of the waveform signal 95, 96, prevents switching of the field coil excitation at rates above the frequency of the signals 95 and 96 and thereby prevents excessive power dissipation in the driver stage 55. This has been achieved since the field coil excitation of the present battery charging system will always occur at a frequency related to the signal waveform period T wherein only the duty cycle of this waveform is altered to provide variation of the field coil excitation to maintain the charge on the battery 12.

It should be noted that since the present system is a closed loop feedback system for an automotive alternator, the present system will attempt to maintain the voltage at the terminal E at a constant level. Under conditions of extremely low battery load the present system will maintain the voltage at the terminal E at substantially the positive peaks of the signal 88 such that only negative impulses are produced at the terminal D which result in only inconsequential excitation of the field coil 20. However, it should be noted that the effective field coil excitation is always contemplated as occurring at a constant repetitive rate dictated by the period T which is related to the constant frequency of the signal 88.

While I have shown and described specific embodiments of this invention, further modifications and improvements will occur to those skilled in the art. All such modifications which retain the basic underlying principals disclosed and claimed herein are within the scope of this invention.

I claim:

1. A regulated automotive alternator battery charging system comprising:

a battery;

alternator means coupled to said battery and driven by a vehicle engine for providing a rectified output charging signal for charging said battery in accordance with an excitation signal received by an alternator field coil; and voltage regulator means coupled to said alternator means for providing said excitation signal in response to a sensed signal magnitude related to battery voltage, said battery, alternator means and regulator means forming a closed loop feedback system for maintaining said battery in a charged condition;

said voltage regulator means providing for effective field coil excitation at a constant frequency and varying the duty cycle of said constant frequency field coil excitation in accordance with said sensed signal magnitude, said voltage regulator means including means for developing a substantially constant frequency signal, means for varying the duty cycle of this constant frequency signal in accordance with the magnitude of the sensed voltage related to battery voltage, and means for utilizing the variable duty cycle constant frequency signal to provide said alternator field coil excitation signal to control the effective field coil excitation of said alternator, whereby said field coil excitation is accomplished at a constant frequency and the effect of low frequency ripple caused by the low frequency, below said constant frequency, application of field coil excitation in response to engine speed and battery load variations in minimized, while excessive power dissipation occurring because of switching field coil excitation at too high a rate is prevented, wherein said means for developing said constant frequency signal comprises an oscillator, wherein said oscillator comprises an analog triangle wave generator which provides an analog triangle wave signal having a substantially constant frequency, wherein said triange wave signal is received by a comparator that compares the magnitude of this signal to a sensed DC signal related to battery voltage and provides as an output a variable pulse width signal having a constant frequency but a duty cycle related to the sensed battery voltage, and which includes an ignition switch and a power supply circuit, said power supply circuit coupled to said battery by said ignition switch and also coupled to said triangle wave generator and said comparator, in response to closure of said ignition switch said power supply circuit being electrically connected to said battery and providing a stable regulated voltage to both said triangle wave generator and said comparator for providing operative power thereto, said ignition switch also coupling said battery to said field coil through first diode means for providing initial field coil energization potential, said system including additional auxiliary rectifier means for providing, at an auxiliary output terminal, an output signal for supplying subsequent field coil energization potential and preventing said diode means from supplying such field coil potential, and second diode means coupled between said auxiliary output terminal and said power supply circuit for supplying operative power thereto in the event of a broken direct connection between the battery and said power supply circuit.

2. An automotive alternator battery charging system according to claim 1 wherein said utilization means comprises circuitry for providing DC field coil excitation to the alternator field coil in accordance with the variable duty cycle signal.

3. An automotive alternator battery charging system according to claim 2 wherein said utilization means periodically energizes and de-energizes the alternator field coil at a constant frequency rate determined by the frequency of the constant frequency signal.

4. An automotive alternator battery charging system according to claim 3 wherein said alternator field coil is rotated by an engine to provide a rotating field for exciting stationary output windings in said alternator that provide a rectified battery charging output signal, and wherein said constant frequency for providing effective field coil excitation current is substantially independent of the rotational speed of the field coil.

5. An automotive alternator battery charging system according to claim 1 wherein said triangle wave generator includes a resistor-capacitor circuit for determining said constant frequency of said triangle wave signal.

6. An automotive alternator battery charging system according to claim 1 wherein said second diode means is coupled to said regulator means and also supplies said sensed signal magnitude related to battery voltage in the event of a broken direct connection between the battery and said regulator means.

* * * * *